United States Patent Office 3,664,823
Patented May 23, 1972

3,664,823
HERBICIDAL 3-(SUBSTITUTED UREIDO) CROTONAMIDES AND CROTONATES
Harvey M. Loux, Hockessin, Del., assignor to E. I. du Pont de Nemours and Company, Wilmington, Del.
No Drawing. Continuation-in-part of application Ser. No. 775,568, Sept. 30, 1968, which is a continuation-in-part of application Ser. No. 678,548, Oct. 27, 1967, which in turn is a continuation-in-part of application Ser. No. 533,223, Mar. 10, 1966. This application Dec. 4, 1969, Ser. No. 882,343
Int. Cl. A01n 9/20
U.S. Cl. 71—111
2 Claims

ABSTRACT OF THE DISCLOSURE

This invention relates to herbicidal methods, compounds and compositions utilizing as an essential ingredient a compound of the following formula:

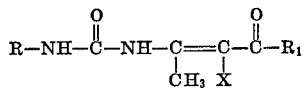

wherein
R is alkyl, phenyl, o-fluorophenyl, cycloalkyl, or cycloalkylmethyl;
$R_1$ is $-OR_2$ or

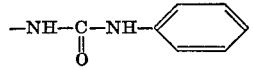

$R_2$ is alkyl, cyclohexyl, phenyl, substituted phenyl, benzyl or substituted benzyl;
X is methyl or halogen, with the limitation that when $R_1$ is

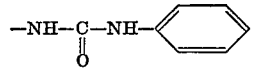

R is restricted to phenyl or o-fluorophenyl.

Typical of the compounds of this invention is 2-bromo-N - (phenylcarbamoyl) - 3 - (3 - phenylureido)crotonamide which is useful as an herbicide.

CROSS REFERENCE TO RELATED APPLICATIONS

This application is a continuation-in-part of my copending application Ser. No. 775,568, filed Sept. 30, 1968, which is a continuation-in-part of my then copending application Ser. No. 678,548, filed Oct. 27, 1967, which was a continuation-in-part of my then copending application Ser. No. 533,223, filed March 10, 1966, all now abandoned.

BACKGROUND OF THE INVENTION

The development of a new class of herbicidal compounds as set forth in my U.S. Pat. 3,235,357 indicated an area of chemistry relating to the intermediates for making the herbicidal compounds of U.S. Pat. 3,235,357 which it has been discovered also have herbicidal activity.

SUMMARY OF THE INVENTION

This invention relates to crotonamides and crotonates, having herbicidal activity, compositions employing these compounds and methods for using them as herbicides.
The compounds of this invention are illustrated by the following formula:

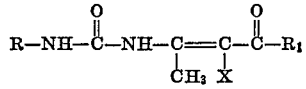

wherein
R is selected from the group consisting of alkyl of 3 to 8 carbon atoms, phenyl, o-fluorophenyl, cycloalkyl of 5 to 8 carbon atoms, or cycloalkylmethyl of 6 to 8 carbon atoms;
$R_1$ is selected from the group consisting of $-OR_2$ and

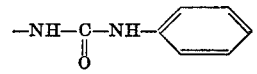

$R_2$ is an alkyl of 1 to 4 carbon atoms, cyclohexyl, phenyl, substituted phenyl, benzyl or substituted benzyl;
X is methyl or halogen; with the limitations that when $R_1$ is

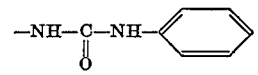

R is phenyl or o-fluorophenyl.

In the formulas, the term "substituted phenyl" embraces such radicals as
Chlorophenyl,
Dichlorophenyl,
Bromophenyl,
Alkoxyphenyl of 7 through 10 carbon atoms (total),
Dibromophenyl,
Fluorophenyl,
Trichlorophenyl,
Alkylphenyl of 7 through 10 carbon atoms (total),
Dialkylphenyl of 8 through 12 carbon atoms (total),
Chloroalkylphenyl of 7 through 10 carbon atoms (total),
Nitrochlorophenyl,
Nitrophenyl,
Dinitrophenyl,
Dichloronitrophenyl,
Chloroalkoxyphenyl of 7 through 10 carbon atoms (total),
Trifluoromethylphenyl, and
Dinitroalkylphenyl of 7 through 10 carbon atoms (total).

The term "substituted benzyl" is intended to include such radicals as
Chlorobenzyl,
Bromobenzyl,
Dichlorobenzyl,
Alkylbenzyl of 8 through 11 carbon atoms (total),
Dialkylbenzyl of 9 through 12 carbon atoms (total),
Nitrobenzyl, and
Alkoxybenzyl of 8 through 11 carbon atoms (total).

Preferred compounds because of their outstanding herbicidal activity and economy of preparation are those compounds of the formula wherein the substituents are as follows:

R is phenyl,
$R_1$ is

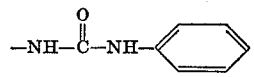

or $-OR_2$, and
X is chlorine, bromine or methyl.

These compounds are preferred in that many have substantial herbicidal activity at low concentrations. Also preferred are those novel compounds of the formula wherein the structural formula is:

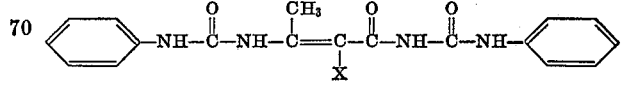

where X is chlorine, bromine or methyl.

Those compounds which are most preferred, having the best use-cost ratio are the following:

2-methyl-N-phenylcarbamoyl-3-(3-phenylureido)crotonamide
2-bromo-N-phenylcarbamoyl-3-(3-phenylureido)crotonamide
2-chloro-N-phenylcarbamoyl-3-(3-phenylureido)crotonamide
phenyl 2-chloro-3-(3-phenylureido)crotonate
ethyl 2-methyl-3-(3-phenylureido)crotonate
ethyl 2-chloro-3-(3-phenylureido)crotonate

PREPARATION

Illustrative of the general preparation of the compounds of the invention which are esters and crotonamides is the following reaction scheme:

A.

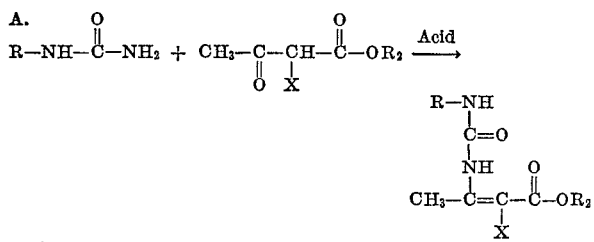

and

B.

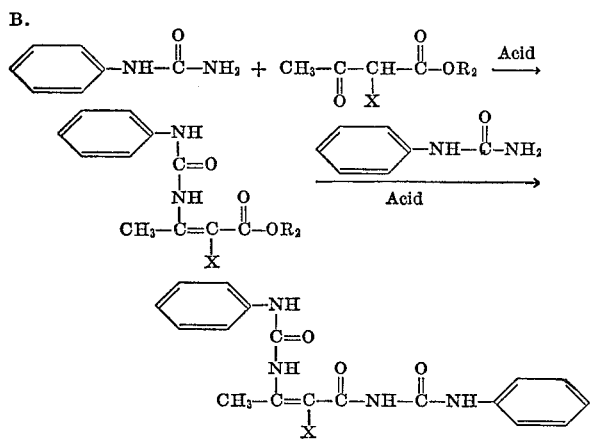

X and R and $R_2$ are defined above.

A substituted urea is reacted with an α-substituted acetoacetic acid ester in the presence of a small amount of an acid catalyst such as p-toluenesulfonic acid or sulfuric acid in an inert water-immiscible solvent such as benzene or toluene. Water is eliminated during the condensation. This water is removed from the reaction site as quickly as possible, as for example by azeotropic distillation.

Those compounds of this invention where X is chlorine, bromine and iodine are also prepared by direct halogenation with sulfuryl chloride, N-bromosuccinimide, bromine and iodine respectively as illustrated for the bromination reaction in C.

C.

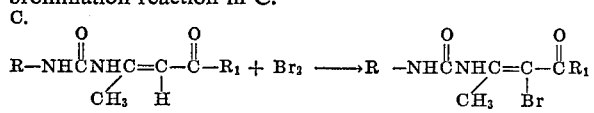

The reaction mix is cooled and stripped free of solvent under reduced pressure yielding a mixture of products. This mixture is generally of sufficient purity to be formulated directly as a herbicidal composition without further purification. The technical materials obtained above may however be recrystallized from a variety of solvents such as ethanol, water and cyclohexane. Alternatively, the reaction mixture is cooled and filtered if necessary. The solid, a mixture of starting urea and 1,3-disubstituted urea, is discarded.

In the case of reaction A, the organic layer is stripped of solvent and the residue recrystallized from a solvent such as ethanol, yielding the ureidocrotonate.

In the case of reaction B, the organic layer is extracted with sodium hydroxide solution, which yields on acidification with a suitable acid, the crotonamide, which may be recrystallized from a solvent, such as acetonitrile. The organic layer which has been extracted with sodium hydroxide solution is stripped of solvent and the residue recrystallized from a solvent, such as ethanol, yielding the ureidocrotonate.

When X is a chlorine, bromine or iodine atom, the compounds may also be made by synthesizing the unsubstituted ureidocrotonate or crotonamide first and then halogenating these with a suitable reagent such as sulfuryl chloride, N-bromosuccinimide or iodine and nitric acid.

UTILITY

The compounds used in this invention are useful for controlling the growth of many unwanted weeds and vegetation. Examples of some of the weeds and vegetation which may be controlled with the compounds used in this invention are the following:

crabgrass—Digitaria spp.
goosegrass—*Eleusine indica*
white clover—*Trifolium repens*
broomsedge—*Andropogon virginicus*
povertygrass—*Sporobolus vaginiflorus*
dune sandspur—Cenchrus spp.
carpetweed—*Mollugo verticillata*
common chickweed—*Stellaria media*
mouse-ear chickweed—*Cerastium vulgatum*
purslane—*Portulaca oleracea*
downy brome—*Bromus tectorum*
the foxtails—Setaria spp.
fall panicum—*Panicum dichotomiflorum*
annual morning-glory—Ipomoea spp.
lamb's-quarters—*Chenopodium album*
ragweed—Ambrosia spp.
mustard—Brassica spp.
quackgrass—*Agropyron repens*
smooth bromegrass—*Bromus inermis*
nutsedge—Cyperus spp.
wild carrot—*Daucus carota*
cheatgrass—*Bromus secalinus*
peppergrass—Lepidium spp.
wild oats—*Avena fatua*
poison ivy—*Rhus radicans*
witchgrass—*Panicum capillare*
birch—Betula spp.
box elder—*Acer negundo*
willow—Salix spp.
oaks—Quercus spp.

In accordance with the present invention, these crotonamides and crotonates hereof have been useful for controlling the growth of unwanted vegetation. When applied at rates of ½ to 50 kg./hectare, they control many species of herbaceous and woody plants. As will be obvious to those skilled in the art, the preferred rate depends on the time and method of application and the species to be controlled. In general, the lower rates are used in crops to control annual weeds and the higher rates for control of perennial or established annual vegetation in non-crop land.

COMPOSITIONS

The herbicidal compounds defined herein may normally be incorporated with various materials to prepare compositions suitable for application by conventional agricultural equipment. Suitable compositions of the present invention can be prepared by admixing at least one of the active components with pest control adjuvants or modifiers to provide solid or liquid compositions in the form of dusts, granules, pellets, water-dispersible and water-soluble powders, high-strength concentrates, aqueous dispersions or emulsions and solutions or dispersions in organic liquids. Suitable solid carriers are natural clays such as kaolinite, attapulgite and montmorillonite. In addition, talcs, pyrophillite, diatomaceous silica, synthetic fine silicas, calcium aluminosilicates, sodium aluminosilicates and tricalcium phosphate are suitable solid carriers. Organic materials such as walnut shell flour, wood flour or redwood bark flour may also be used as a suitable solid carrier. The percentages by weight of the essential active ingredient will vary with the manner in which the composition is to be applied. The content of active component may be as low as 0.5% when applied as a dust or as high as 95% when used as a spot treatment in small isolated areas.

Liquid herbicidal compositions consist, for example, of the active compounds homogeneously dispersed in water or other non-solvent medium such as substantially aliphatic hydrocarbon oil. Since certain of the active compounds of this invention are water-soluble in the presence of alkali, liquid compositions may also be true solutions in water if combined with a strong base such as sodium hydroxide or sodium metasilicate. Oil solutions may also be prepared with solvents such as aromatic hydrocarbons, chlorinated hydrocarbons, esters and ketones. In order to secure homogeneous dispersions in nonsolvent media, surface active agents are used. In fact, preferred herbicidal compositions of this invention whether liquid or solid contain the active component homogeneously admixed with one or more surfactants as well as carriers. These surface active agents are those commonly known as wetting agents, dispersing agents and emulsifying agents. They may act as wetting agents for wettable powders, pellets, granules, high strength concentrates and dusts, as dispersing agents for wettable powders and suspensions and as emulsifying agents for emulsifiable concentrates. Surfactants may also enhance the biological activity of the compounds of this invention. Such surface active agents can include anionic, cationic and nonionic substances.

In general, less than 10% by weight of the surface-active agent will be used in compositions of this invention and ordinarily the amount of surface-active agents will range from 1–5% but may even be less than 1% by weight.

Additional surface-active agents can be added to the formulations to increase the ratio of surfactant:active ingredient up to as high as 5:1 by weight. Such compositions have a greater herbicidal effectiveness than can be expected from a consideration of the activity of the components used separately. When used at higher rates it is preferred that the surfactant be present in the range of one-fifth to five parts surfactant for each one part of active agent.

A comprehensive list of such agents may be found in "Detergents and Emulsifiers, 1967 Annual" by John W. McCutcheon. A few dispersants of nonionic type such as low-viscosity methylcellulose, low-viscosity polyvinyl-alcohol and acacia gum are not listed in the above annual but have also been found to be suitable.

Suitable surface active agents for use in compositions of this invention include polyethylene glycol esters with fatty acids and rosin acids, polyethylene glycol ethers with alkylated phenols or with long-chain aliphatic alcohols, polyethylene glycol ethers with sorbitan fatty acid esters, and polyoxyethylene thioethers. Still other suitable surfactants include amine, alkali and alkaline earth salts of alkylaryl sulfonic acids, amine, alkali and alkaline earth fatty alcohol sulfates, dialkyl esters of alkali metal sulfosuccinates, fatty acid esters of amine, alkali and alkaline earth isethionates and taurates, amine, alkali and alkaline earth salts of lignin sulfonic acids, hydroxyethylated cellulose, amine, alkali and alkaline earth salts of polymerized alkylnaphthalene sulfonic acids, and long-chain quaternary ammonium compounds. Anionic and nonionic surface active agents are preferred.

Among preferred wetting agents are sodium alkylnaphthalene sulfonates, sodium dioctylsulfosuccinate, sodium dodecylbenzene sulfonate, ethylene oxide condensates with alkylated phenols such as octyl, nonyl, or dodecylphenol, sodium lauryl sulfate, and trimethylnonyl polyethylene glycol.

Among preferred dispersing agents are sodium, calcium, and magnesium lignin sulfonates, low viscosity methyl cellulose, polymerized sodium alkylnaphthalene sulfonate, sodium N-oleyl or N-lauryl isethionates, sodium N-methyl-N-oleyl taurate, sodium dodecyldiphenyloxide disulfonate, and polyethylene oxide adducts to mixed fatty and rosin acids. A preferred dispersant for oil suspensions is soya lecithin.

Among preferred emulsifying agents are ethylene oxide adducts to sorbitan esters of lauric, oleic, stearic, or palmitic acid, polyethylene glycol esters with lauric, oleic, stearic, palmitic, or rosin acids, oil-soluble alkylaryl sulfonates, oil-soluble polyoxyethylene ethers with octyl-, nonyl-, and dodecylphenol, polyoxyethylene adducts to long-chain mercaptans, and mixtures of these surfactants.

Compositions of the herbicidal crotonamides and crotonates with inert solid diluents are ordinarily prepared in two forms; a wettable powders or dusts with finely divided dilutents and as granules or pellets with agglomerated forms of the diluent. When the composition is a wettable powder, a mixture of the active ingredient, inert diluent, wetting agent, dispersing agent and optionally corrosion inhibitor and/or anti-foaming agent is intimately blended and ground until substantially all particles are below 50 microns. The content of active component may vary from 20%–95% but 50%–80% is generally preferred.

Thus, wettable powder formulations of the invention will contain from about 20 to 95 weight percent active material, from 0.5 to 2.0 weight percent wetting agent, from 0.25 to 5.0 weight percent dispersant, and from 4.25 to 79.25% weight percent inert extender, as these terms are described.

When the wettable powder contains a corrosion inhibitor or an anti-foaming agent or both, the corrosion inhibitor will not exceed about 1 percent of the composition, and the anti-foaming agent will not exceed about 0.5 percent by weight of the composition, both replacing equivalent amounts of the inert extender.

Dusts are dense powder compositions which are intended for application in dry form, in accordance with the preferred compositions and methods of the invention. Dusts are characterized by their free-flowing and rapid settling properties so that they are not readily windborne to areas where their presence is not desired. They contain primarily an active material and a dense, free-flowing, solid extender.

Their performance is sometimes aided by the inclusion of a wetting agent, and convenience in manufacture frequently demands the inclusion of an inert, absorptive grinding aid. For the dust compositions of this invention, the inert extender may be either of vegetable or mineral origin, the wetting agent is preferably anionic or non-ionic, and suitable absorptive grinding aids are of mineral origin.

Suitable classes of inert solid extenders for use in the dust compositions are those organic or inorganic powders which possess high bulk density and are very free-flowing. They are also characterized by possessing relatively low surface areas and are poor in liquid absorption. Suitable classes of grinding aids are natural clays, diatomaceous earths, and synthetic mineral fillers derived from silica or silicate. Among ionic and non-ionic wetting agents, the most suitable are the members of the group known to the art as wetting agents and emulsifiers. Although solid agents are preferred because of ease in incorporation some liquid non-ionic agents are also suitable in the dust formulations.

Preferred inert solid extenders for the dusts of this invention are micaceous talcs, pyrophyllite, dense kaolin clays, tobacco dust and ground calcium phosphate rock such as that known as "Phosphodust," a trademark of the American Agricultural Chemical Company.

Preferred grinding aids are attapulgite clay, diatomaceous silica, synthetic fine silica and synthethic calcium and magnesium silicates. Preferred wetting agents are those previously described under wettable powder formulations.

The inert solid extenders in the dusts of this invention are usually present in concentrations of from about 30 to 90 weight percent of the total composition. The grinding aid will usually constitute 5 to 50 weight percent of the composition, and the wetting agent will constitute from about 0 to 1.0 weight percent of the composition. Dust compositions can also contain other surfactants such as dispersing agents in concentrations of up to about 0.5 weight percent.

The wettable powders described above can also be used in the preparation of dusts. While such wettable powders could be used directly in dust form, it is more advantageous to dilute them by blending with the dense dust diluent. In this manner, dispersing agents, corrosion inhibitors, and anti-foam agents may also be found as components of a dust.

Thus, the dust compositions of this invention will comprise about 5 to 20 weight percent active material, 5 to 50 weight percent absorptive filler, 0 to 1.0 weight percent wetting agent, and about 30 to 90 weight percent dense, free-flowing dust diluent, as these terms are used herein. Such dust formulations can contain, in addition, minor amounts of dispersants, corrosion inhibitors, and anti-foam agents, derived from the wettable powders used to make the dusts.

Granules and pellets are physically stable, particulate compositions containing an active compound which adheres to or is distributed through a basic matrix of a coherent, inert carrier with macroscopic dimensions. In order to aid leaching of the active ingredient from the granule or pellet, a surfactant can be present.

For the compounds of this invention, the inert carrier is preferably of mineral origin.

Suitable carriers are natural clays, some pyrrophyllites and vermiculite. Suitable wetting agents are anionic or non-ionic.

For the granule compositions of this invention, most suitable carriers are of two types. The first are porous, absorptive, preformed granules, such as preformed and screened granular attapulgite or heat expanded, granular, screened vermiculite. On either of these, a solution or suspension of the active agent can be sprayed and will be absorbed or adsorbed at concentrations up to 25 weight percent of the total weight. The second, which are also suitable for pellets, are initially powdered kaolin clays, hydrated attapulgite, or bentonite clays in the form of sodium, calcium or magnesium bentonities. Water-soluble salts, such as sodium salts, may also be present to aid in the disintegration of granules or pellets in the presence of moisture. These ingredients are blended with the active components to give mixtures that are granulated or pelleted, followed by drying, to yield formulations with the active component distributed uniformly throughout the mass. Such granules and pellets can also be made with 25 to 30 weight percent active component, but more frequently a concentration of about 10 weight percent is desired for optimum distribution. The granular compositions of this invention are most useful in a size range of 15–60 mesh.

The most suitable wetting agents for the granular compositions of this invention depend upon the type of granule used. When preformed granules are sprayed with active material in liquid form the most suitable wetting agents are non-ionic, liquid wetters miscible with the solvent. These are compounds more generally known to the art as emulsifiers, and comprise alkylaryl polyether alcohols, alkyl polyether alcohols, polyoxyethylene sorbitan fatty acid esters, polyethylene glycol esters with fatty or rosin acids, fatty alkylol amide condensates, oil soluble petroleum or vegetable oil sulfonates, or mixtures of these. Such agents will usually comprise up to about 5 weight percent of the total composition.

When the active ingredient is first mixed with a powered carrier and subsequently granulated, or pelleted, liquid non-ionic wetters can still be used, but it is usually preferable to incorporate at the mixing stage one of the solid, powdered anionic wetting agents such as those previously listed for the wettable powders. Such agents will comprise from about 0 to 2 weight percent of the total composition.

Thus, the preferred granular or pelleted formulations of this invention comprise about 5 to 30 weight percent active material, about 0 to 5 weight percent wetting agent, and about 65 to 95 weight percent inert mineral carrier, as these terms are used herein.

High-strength compositions generally consist of 90 to 99.5% active ingredient and 0.5 to 10% of a liquid or solid surfactant. Small amounts of conditioning agents may also be included, replacing an equal weight of surfactant. Such high-strength compositions can often be used in a manner similar to the wettable powders but they are also suitable for further formulation.

The aqueous suspension concentrates are prepared by mixing together and sandgrinding an aqueous slurry of water-insoluble active ingredient in the presence of dispersing agents. Thus, there is obtained a concentrated slurry of very finely divided particles in which the active ingredient is substantially all below 5 microns in size. This concentrated aqueous suspension is characterized by its extremely small particle size so that upon diluting and spraying, a very uniform coverage is obtained.

These aqueous suspension concentrates will contain from 15 to 40% of active ingredient, from 45 to 70% water with the remainder made up of surfactants, corrosion inhibitors, and suspending agents.

Suspension in organic liquids can be prepared in a similar manner such as by replacing the water with mineral oil.

Emulsifiable oils are usually solutions of active material in non-water-miscible solvents together with a surfactant.

For the compounds of this invention, emulsifiable oils can be made by mixing the active ingredient with a solvent and surfactant. Suitable solvents for the compounds of this invention are aromatic hydrocarbons including many weed oils, chlorinated solvents, and non-water-miscible ethers, esters, or ketones. Suitable surfactants are those anionic or nonionic agents known to the art as emulsifying agents.

Emulsifying agents most suitable for the emulsifiable oil compositions of this invention are long-chain alkyl or mercaptan polyethoxy alcohols, alkylaryl polyethoxy alcohols, sorbitan fatty acid esters, polyoxyethylene ethers with sorbitan fatty acid esters, polyethylene glycol esters with fatty or rosin acids, fatty alkylol amide condensates, calcium and amine salts of fatty alcohol sulfates, oil soluble petroleum sulfonates, or, preferably, mixtures of these emulsifying agents. Such emulsifying agents will comprise from about 1 to 10 weight percent of the total composition. As described above, however, up to 5 parts of emulsifying agent for each part of active compound can be used.

Thus, emulsifiable oil compositions of the present invention will consist of from about 15 to 50 weight percent active material, about 40 to 82 weight percent solvent, and about 1 to 10 weight percent emulsifier, as these terms are defined and used above.

In some instances the oil solution may be intended merely for extension with other oils, such as weed oils. In this instance, the emulsifying agents may be omitted and may be replaced by additional solvent.

Water-soluble formulations can be prepared by combining certain compounds of this invention with alkaline solubilizing agents such as alkali metal hydroxide, silicates, phosphates and carbonates. Such compositions will consist of 20–80% active compound, 5–40% of alkali metal hydroxide, phosphate or silicate and 15–40% of alkali metal carbonate.

APPLICATION

The compounds used in this invention are generally applied to a locus to be protected from undesirable vegetation. The locus to be protected is the soil. It may be barren of vegetation at the time the compounds are applied or vegetation may have begun to appear or be even fully developed. The locus to be protected also includes the surface of various weeds whose destruction is desired. Undesired vegetation can be any plants which are generally classified as weeds or for that matter any plant which is growing in an area in which the plant is not desired.

The herbicidally effective amount of a compound used in this invention which will control undesired vegetation depends on climatic conditions and soil type. The exact quantity required will be apparent to one skilled in the art. Generally, the compounds used in this invention are applied to sandy soils at rates of 2 to 60 kilograms per hectare, and the preferred rate is in the range of 5 to 40 kilograms per hectare. It was noted that the compounds of the invention are most advantageously applied to the soil in the early spring before the new growth of vegetation begins.

The following examples illustrate the preparation, formulation and application of the herbicidal compounds of the invention. All parts and percentages are by weight unless otherwise indicated.

PREPARATION

Example I

A mixture of 11 parts of phenylurea, 5.9 parts of ethyl 2-methylacetoacetate, 0.5 part of p-toluenesulfonic acid, and 90 parts of benzene is refluxed for four days with stirring and continuous removal of water by means of a suitable condenser trap. Six-tenths parts of water is collected. The mixture is filtered. About 2 parts of 1,3-diphenylurea is obtained. One-half of the solution is stripped of solvent under reduced pressure and the remaining cake is dried and pulverized.

The other half of the benzene solution is extracted with 100 parts of 5% sodium hydroxide solution and the latter is acidified with concentrated hydrochloric acid. The resulting precipitate is collected on a filter and washed thoroughly with water. Four parts of 2-methyl-N-(phenylcarbamoyl)-3-(3-phenylureido)crotonamide is obtained.

The benzene of the organic layer is evaporated in vacuo. The residue consists of 1 part of 2-methyl-3-(3-phenylureido)crotonic acid, ethyl ester.

In an analogous manner the following compounds are made:

2-fluoro-3-(3-phenylureido)crotonic acid, methyl ester
2-fluoro-3-(3-phenylureido)crotonic acid, ethyl ester
2-methyl-3-(3-phenylureido)crotonic acid, butyl ester
2-methyl-N-(phenylcarbamoyl)-3-[3-(o-fluorophenyl)ureido]crotonamide
2-fluoro-N-(phenylcarbamoyl)-3-(3-phenylureido)crotonamide
2-methyl-3-[3-(o-fluorophenyl)ureido]crotonic acid, ethyl ester.

Example II

A mixture of 20.0 parts of phenylurea, 24.2 parts of ethyl α-chloroacetoacetate, 1 part of p-toluenesulfonic acid, and 88 parts of benzene is refluxed and stirred in a vessel equipped with a Dean-Stark Trap until water ceases to evolve from the reaction. The mixture is cooled and filtered to remove 1,3-diphenylurea. The organic layer is washed with 5% sodium hydroxide solution to remove simultaneously formed 5-chloro-6-methyl-3-phenyluracil and stripped of the benzene in vacuo. The residue is recrystallized from an ethanol-water mixture to separate from 5-methyl-2-oxo-3-phenyl-4-imidazoline-4-carboxylic acid, ethyl ester. Pure 2-chloro-3-(3-phenylureido)crotonic acid, ethyl ester is obtained.

The following compounds are synthesized in an analogous fashion:

2-chloro-3-(3-phenylureido)crotonic acid, methyl ester
2-chloro-3-(3-phenylureido)crotonic acid, butyl ester
2-chloro-3-(3-phenylureido)crotonic acid, cyclohexyl ester
2-chloro-3-(3-phenylureido)crotonic acid, p-methoxyphenyl ester
2-chloro-3-(3-phenylureido)crotonic acid, p-tolyl ester
2-chloro-3-(3-phenylureido)crotonic acid, 4-(sec-butyl)phenyl ester
2-chloro-3-(3-phenylureido)crotonic acid, p-(sec-butoxy)phenyl ester
2-chloro-3-(3-phenylureido)crotonic acid, phenyl ester
2-chloro-3-(3-phenylureido)crotonic acid, 3,5-dimethylphenyl ester
2-chloro-3-(3-phenylureido)crotonic acid, 3,5-(diisopropyl)phenyl ester
2-chloro-3-(3-phenylureido)crotonic acid, 2-chloro-4-methylphenyl ester
2-chloro-3-(3-phenylureido)crotonic acid, 2-chloro-4-(sec-butyl)phenyl ester
2-chloro-3-(3-phenylureido)crotonic acid, 2-chloro-4-methoxyphenyl ester
2-chloro-3-(3-phenylureido)crotonic acid, 2-chloro-4-(sec-butoxy)phenyl ester
2-chloro-3-(3-phenylureido)crotonic acid, 2,4-dichlorobenzyl ester
2-chloro-3-(3-phenylureido)crotonic acid, p-bromobenzyl ester
2-chloro-3-(3-phenylureido)crotonic acid, 2,4-dibromophenyl ester
2-chloro-3-(3-phenylureido)crotonic acid, p-nitrophenyl ester
2-chloro-3-(3-phenylureido)crotonic acid, p-methoxybenzyl ester
2-chloro-3-(3-phenylureido)crotonic acid, p-sec-butoxy)benzyl ester

Example III 2-bromo-3-(3-phenylureido)crotonic acid, ethyl ester.—Four parts of 3-(3-phenylureido)crotonic acid, ethyl ester is dissolved in 20 parts of carbon tetrachloride. 2.8 parts of N-bromosuccinimide and 0.4 parts of benzoyl peroxide are added and the mixture stirred overnight at room temperature. The mixture is filtered and washed with water to remove succinimide. The carbon tetrachloride is removed in vacuo after drying over anhydrous magnesium sulfate and the residue is recrystallized from an ethanol-water mixture. 4 parts of 2-bromo-3-(3-phenylureido)crotonic acid, ethyl ester, M.P. 101–103° C. is obtained.

Starting with the appropriate crotonic ester, the following analogs may be synthesized in an analogous manner:

2-bromo-3-(3-amylureido)crotonic acid, ethyl ester
2-bromo-3-(3-butylureido)crotonic acid, ethyl ester

Example IV 2-chloro-3-(3-butylureido)crotonic acid, ethyl ester.—A mixture of 40 parts of butylurea, 56.6 parts of ethyl α-chloroacetoacetate, 2 parts of p-toluenesulfonic acid and 160 parts of benzene is refluxed overnight under continuous removal of water by means of a Dean-Stark trap. 5 parts of water is collected. The reaction mixture is cooled and filtered to remove unreacted urea, and the organic layer extracted with 5% sodium hydroxide solution to remove unreacted ethyl α-chloroacetoacetate and with 10% hydrochloric acid in order to remove 3-butyl-5-methyl-2-oxo-4-imidazoline-4-carboxylic acid, ethyl ester. The organic layer is dried over anhydrous magnesium sulfate, filtered and the benzene removed in vacuo. The residue is recrystallized from ethyl acetate yielding 2-chloro-3-(3-butylureido)crotonic acid, ethyl ester, M.P. 97–99° C.

Starting with the appropriate crotonic esters and ureas, the following analogs may be synthesized in an analogous manner:

2-chloro-3-(3-octylureido)crotonic acid, ethyl ester
2-chloro-3-(3-cyclopentylmethylureido)crotonic acid, 3,4-dichlorophenyl ester
2-chloro-3-(3-cyclohexylmethylureido)crotonic acid, methyl ester
3-(3-amylureido)-2-chlorocrotonic acid, ethyl ester
2-chloro-3-(3-butylureido)crotonic acid, phenyl ester
2-chloro-3-(3-cycloheptylmethyl)crotonic acid, p-bromophenyl ester
2-chloro-3-(3-cyclohexylureido)crotonic acid, 2,4-dinitro-6-(sec-butyl)phenyl ester
2-chloro-3-(3-butylureido)crotonic acid, p-methylbenzyl ester
2-chloro-3-[3-(sec-butyl)ureido]crotonic acid, p-nitrobenzyl ester
2-chloro-3-(3-butylureido)crotonic acid, p-(sec-butyl)-benzyl ester
2-chloro-3-(3-propylureido)crotonic acid, 3,4-dimethylbenzyl ester
2-chloro-3-(3-amylureido)crotonic acid, 2-methyl-4-(sec-butyl)benzyl ester
2-chloro-3-[3-(tert-butyl)ureido]crotonic acid, 2,4-dinitrophenyl ester
2-chloro-3-[3-(tert-butyl)ureido]crotonic acid, p-chlorophenyl ester
2-chloro-3-[3-(tert-butyl)ureido]crotonic acid, 2,4-dinitro-6-methylphenyl ester
2-chloro-3-(3-butylureido)crotonic acid, cyclohexyl ester
2-chloro-3-(3-butylureido)crotonic acid, m-chlorobenzyl ester
2-chloro-3-(3-cyclooctylureido)crotonic acid, 2-chloro-4-nitrophenyl ester
2-chloro-3-(3-cyclopentylureido)crotonic acid, p-nitrophenyl ester
2-chloro-3-(3-cyclopentylureido)crotonic acid, p-fluorophenyl ester
2-chloro-3-[3-(sec-butyl)ureido]crotonic acid, 2,6-dichloro-4-nitrophenyl ester
2-chloro-3-(3-propylureido)crotonic acid, 2,3,6-trichlorophenyl ester
2-chloro-3-(3-amylureido)crotonic acid, p-trifluoromethylphenyl ester
2-chloro-3-(3-phenylureido)crotonic acid, benzyl ester Example V 3-(3-butylureido)-2-methylcrotonic acid, ethyl ester.— A mixture of 10 parts of butylurea, 6.2 parts of ethyl α-methylacetoacetate, and 0.5 parts of p-toluene sulfonic acid is refluxed in 80 parts of benzene under continuous removal of water by means of a Dean-Stark trap overnight. 0.5 part of water is collected. The reaction mixture is cooled, filtered, and the solvent evaporated. The residue is recrystallized from ethyl acetate yielding 5 parts of 3-(3-butylureido)-2-methylcrotonic acid, ethyl ester, M.P. 66–68° C.

Starting with the appropriately substituted acrylic esters and ureas, the following analogs may be prepared in an analogous manner:

3-(3-amylureido)-2-methylcrotonic acid, butyl ester
3-(3-amyureido)-2-fluorocrotonic acid, ethyl ester
3-(3-isoamylureido)-2-fluorocrotonic acid, phenyl ester Example VI 2-bromo-N-(phenylcarbamoyl)-3 - (3 - phenylureido)-crotonamide.—3.3 parts of N-(phenylcarbamoyl)-3-(3-phenylureido)crotonamide is dissolved in 40 parts of glacial acetic acid together with 0.7 part of anhydrous sodium acetate. A solution of 1.8 parts of bromine in 10 parts of glacial acetic acid is added gradually over a 20-min. period. The mixture is poured onto an ice-water mixture, filtered, and washed thoroughly with water. The solid is recrystallized from an ethanol-water mixture yielding 2-bromo-N-(phenylcarbamoyl) - 3 - (3 - phenylureido)crotonamide, M.P. 260–262° C.

2-bromo-N-(phenylcarbamoyl)-3-[3 - (o-fluorophenyl)-uredio]crotonamide is prepared in an analogous fashion.

Example VII 2-chloro-N-(phenylcarbamoyl)-3 - (3 - phenylureido)-crotonamide.—3 parts of N-phenylcarbamoyl-3-(3-phenyl-ureido)crotonamide is slurried up in 100 ml. of xylene at 65° C. 1.2 parts of sulfuryl chloride in 10 ml. of xylene is added dropwise over a 10-min. period. The mixture is stirred at 65° C. for 30 minutes, cooled, and extracted with aqueous sodium hydroxide solution. The alkaline solution is acidified with hydrochloric acid, and the precipitate filtered off and washed thoroughly with water and air-dried. M.P. 212–212.5° C.

2-chloro-N-(phenylcarbamoyl)-3-[3 - (o-fluorophenyl)-uredio]crotonamide is prepared in an analogous fashion.

Example VIII 2-iodo-N-(phenylcarbamoyl) - 3 - (3 - phenylureido)-crotonamide.—3.4 parts of N-(phenylcarbamoyl)-3-(3-phenylureido)crotonamide and 1.3 parts of iodine is dissolved in 25 ml. of glacial acetic acid. The solution is heated to 45° C. and 1.1 part of fuming nitric acid added. The reaction mixture is stirred at room temperature for 1 hour and poured onto an ice-water mixture. The product is filtered and recrystallized from an ethanol-water mixture.

FORMULATION AND APPLICATION

Example IX

| | Percent |
|---|---|
| 2-methyl-3-(3-phenylureido)crotonic acid, ethyl ester | 25 |
| Montmorillonite clay | 73 |
| Dioctyl ester of sodium sulfosuccinate | 1 |
| Sodium lignin sulfonate | 1 |

These components are blended in a ribbon blender, micropulverized in a hammer mill until the particles are under 50 microns in diameter, and then reblended until homogeneous. All other compounds of this invention can be formulated in a similar manner.

Forty kilograms of the active ingredient in this formulation is suspended in 200 liters of water and sprayed on a hectare of area around a tank farm. The soil in the area is beach sand containing little clay or organic matter. The reatment results in season long control of such annual and perennial vegetation as crabgrass, goosegrass, white clover, broomsedge, povertygrass, dune sandspur and carpetweed.

The following compounds can be formulated and applied as in the above example and give similar results.

2-chloro-3-(3-propylureido)crotonic acid, 2,3,6-trichlorophenyl ester
2-chloro-3-(3-amylureido)crotonic acid, p-trifluoromethylphenyl ester
2-chloro-3-(3-phenylureido)crotonic acid, 2,4-dibromophenyl ester
2-chloro-3-(3-butylureido)crotonic acid, m-chlorobenzyl ester Example X

| | Percent |
|---|---|
| 2-chloro-3-(3 - phenylureido)crotonic acid, ethyl ester | 80.00 |
| Attapulgite clay | 18.25 |
| Alkylnaphthalene sulfonic acid, Na salt | 1.50 |
| Low viscosity methylcellulose | 0.25 |

These components are blended in a ribbon blender, micropulverized in a hammer mill until the particles are under 50 microns in diameter and then reblended until the powder is homogeneous.

This wettable powder is suspended in water at a rate to give 8 kg. in 200 liters and the suspensions applied to a hectare of asparagus beds in the spring before the spears emerge. The beds have been cultivated to remove any existing vegetation. The treatment gives good control of such weeds as chickweed, both mouseear and common, downy brome, crabgrass, carpetweed and purslane.

The following compounds can be formulated and applied as in the above example and give similar results.

2-chloro-3-[3-(tert-butyl)ureido]crotonic acid, 2,4-dinitrophenyl ester
2-chloro-3-[3-(sec-butyl)ureido]crotonic acid, p-nitrobenzyl ester
2-chloro - 3 - (3-cyclohexylmethylureido)crotonic acid, methyl ester
2-chloro-3-(3-cyclooctylureido)crotonic acid, 2-chloro-4-nitrophenyl ester
2-chloro-3-(3-cyclopentylureido)crotonic acid, p-nitrophenyl ester
2-bromo-3-(3-butylureido)crotonic acid, ethyl ester
2-chloro-3-(3-cyclohexylureido)crotonic acid, p-fluorophenyl ester
2-chloro-3[3-(sec-butyl)ureido]crotonic acid, 2,6 - dichloro-4-nitrophenyl ester

Example XI

A water suspension is prepared by blending the following dry ingredients in a ribbon blender and then grinding them with water in a ball or roller mill until the solids are finely dispersed in the water and the average particle size is less than 5 microns:

| | Percent |
|---|---|
| 2-chloro-3-(3-phenylureido)crotonic acid, phenyl ester | 25 |
| Hydrated attapulgite | 2 |
| Lignin sulfonic acids, Na salt | 5 |
| Water | 68 |

Twenty kilograms of the above material is suspended in 250 liters of water and applied to an acre of gravel driveway. The treatment provides season long control of crabgrass, foxtail and other annual grasses which infest the area. The mixture obtained in Example I can be formulated and applied in like manner.

The following compounds can be formulated and applied as in the above example and give similar results.

2-methyl-3-[3-(o-fluorophenyl)ureido]crotonic acid, ethyl ester
2-methyl-3-(3-phenylureido)crotonic acid, butyl ester
2-chloro - 3 - (3-phenylureido)crotonic acid, cyclohexyl ester

Example XII

A water suspension is prepared by blending the following dry ingredients in a ribbon blender and then grinding with water in a sand-mill:

| | Percent |
|---|---|
| 2-chloro - 3 - (3-phenylureido)crotonic acid, p-tolyl ester | 25 |
| Hydrated attapulgite | 2 |
| $Na_2HPO_4$ | 1 |
| Lignin sulfonic acid, Na salt | 5 |
| Sodium pentachlorophenate | 0.5 |
| Water | 66.5 |

Grinding is continued until essentially all the particles in the suspension have been reduced to diameters of less than 5 microns.

This aqueous suspension is diluted with sufficient water to give a concentration of 5 kg. of the substituted ureidocrotonic acid ester in 100 liters of water and sprayed at a volume rate of approximately 300 liters per hectare along highway ground rails and sign posts. Excellent control of crabgrass, ragweed, mustard, lambsquarters, morningglory, foxtail and fall panicum is obtained.

The following compounds can be formulated and applied as in the above example and give similar results.

2-chloro-3-(3-phenylureido)crotonic acid, p - methoxybenzyl ester
3-(3-isoamylureido)-2-fluorocrotonic acid, phenyl ester
2-chloro-3-(3-phenylureido)crotonic acid, p - methoxyphenyl ester

Example XIII

| | Percent |
|---|---|
| 2 - chloro - 3 - (3 - cyclophentylmethylureido)crotonic acid, 3,4-dichlorophenyl ester | 50 |
| Polyoxyethylene ether with nonyl phenol | 2 |
| Sodium lignin sulfonate | 4 |
| Synthetic fine silica | 10 |
| Attapulgite | 34 |

These components are blended in a ribbon blender, coarsely pulverized in a hammer mill, and air milled until the articles are under 20 microns in diameter. The product is then reblended until homogeneous.

The wettable powder is suspended in water at a rate to give 10 kg. of active ingredient in 350 liters of water. It is then applied in early spring to a freshly cultivated hectare of asparagus before the spears emerge. This treatment gives good control of crabgrass, foxtail, carpetweed, purslane, lambsquarter, and goosegrass.

The following compounds can be formulated similarly and when applied in like manner give like results.

2-chloro-3-(3-butylureido)crotonic acid, cyclohexyl ester
2-chloro-3-(3-octylureido)crotonic acid, ethyl ester
3-(3-amylureido)-2-methylcrotonic acid, ethyl ester
3-(3-amyluredio)-2-fluorocrotonic acid, ethyl ester

Example XIV

An oil suspension is prepared by grinding the following ingredients in a ball or roller mill until the solids are finely dispersed in the oil and the average particle size is less than 5 microns:

| | Percent |
|---|---|
| Methyl ester of 2-fluoro-3-methyl-3-(3-phenyluredio)acrylic acid | 25 |
| Diesel oil | 67 |
| Alkylaryl polyether alcohol | 8 |

Sufficient oil suspension to contain 50 kg. of active ingredient is diluted with 500 liters of a herbicidal oil such as Lion Oil No. 6 and sprayed on a hectare of railroad right-of-way.

This treatment provides extended control of quackgrass, seedlings, foxtail, smooth brome grass, ragweed, nutsedge, Johnson grass, annular morning glory, wild carrott and other weeds growing along the right-of-way.

The following compounds can be formulated and applied as in the above example and give similar results.

2-chloro-3-(3-phenylureido)crotonic acid, 2-chloro-4-methylphenyl ester
2-chloro-3-(3-phenylureido)crotonic acid, 2,4-dichlorobenzyl ester
2-chloro-3-(3-phenylureido)crotonic acid, p-bromobenzyl ester
2-chloro-3-(3-phenylureido)crotonic acid, benzyl ester
2-chloro-3-(3-phenylureido)crotonic acid, methyl ester
2-chloro-3-(3-phenylureido)crotonic acid, phenyl ester

Example XV

An oil suspension is prepared by grinding the following ingredients together in a ball or roller mill until the solids are finely dispersed in the oil and the average particles size of the active ingredient is less than 5 microns:

| | Percent |
|---|---|
| 2-fluoro-3-(3-phenylureido)crotonic acid, methyl ester | 25 |
| Diesel oil | 67 |
| Polyoxyethylene sorbitan ester of mixed rosin and fatty acids | 8 |

This oil suspension can be diluted with water to form a water emulsion.

Sufficient of the above formulation to provide 20 kg. of the substituted crotonic acid ester is suspended in 500 liters of diesel oil and sprayed along foot trails in a park. The application covers one hectare and is applied when the weeds are 5 to 15 inches in height. Such weeds are crabgrass, chickweed, cheatgrass and the foxtails are controlled.

Example XVI

| | Percent |
|---|---|
| 2-chloro-3-(3-butylureido)crotonic acid, p-methylbenzyl ester | 40 |
| Sodium alkylnaphthalene sulfonate | 2 |
| Low viscosity methyl cellulose | 2 |
| Diatomaceous earth | 56 |

The ingredients are blended, passed through a micropulverizer to produce particles under 50 microns, and reblended.

90 kg. of the above formulations are suspended in 1000 liters of water and sprayed on a hectare of area under a fence surrounding a naval installation on a coastal sand low in organic matter. The treatment is made in early spring before annuals have emerged. It controls such weeds as crabgrass, foxtail, lambsquarter, carpetweed, dune sandspur, and povertygrass.

The following compounds can be formulated and applied as in the above example and give like results.

2-chloro-3-(3-cycloheptylmethyl)crotonic acid, p-bromophenyl ester
2-chloro-3-(3-propylureido)crotonic acid, 3,4-dimethylbenzyl ester
2-chloro-3-(3-amylureido)crotonic acid, 2-methyl-4-(sec-butyl)benzyl ester
2-chloro-3-(3-cyclohexylureido)crotonic acid, 2,4-dinitro-6-(sec-butyl)phenyl ester
2-chloro-3-[3-(sec-butyl)ureido]crotonic acid, p-chlorophenyl ester
2-chloro-3-[3-(sec-butyl)ureido]crotonic acid, 2,4-dinitro-6-methylphenyl ester
2-chloro-3-(3-butylureido)crotonic acid, p-(sec-butyl)benzyl ester Example XVII

| | Percent |
|---|---|
| 2-chloro-3-(3-phenylureido)crotonic acid, methyl ester | 20 |
| Attapulgite clay | 78 |
| Alkylnaphthalene sulfonic acid, Na salt | 1 |
| Lignin sulfonic acid, Na salt | 1 |

These ingredients are mixed in a ribbon blender until homogeneous and then charged to a pug mill where sufficient water is blended in to form a thick paste. The paste is extruded from the pug mill. These extrusions are dried and then broken by a rotary crusher into irregular granules ranging in diameter from 0.25–1.0 mm.

These granules may be applied by hand or with a spreader at rate sufficient to give 15–20 kg./ha. to boundary fences, industrial sites, in parking areas and under billboards. They provide control of goosegrass, quackgrass, chickweed, peppergrass crabgrass, the foxtails, and ragweed.

The following compounds can be formulated and applied as in the above example and give similar results.

2-chloro-3-(3-phenylureido)crotonic acid, 4-(sec-butyl)phenyl ester
2-chloro-3-(3-phenylureido)crotonic acid, p-(sec-butoxy)phenyl ester
2-chloro-3-(3-phenylureido)crotonic acid, butyl ester
2-chloro-3-(3-phenylureido)crotonic acid, 3,5-dimethylphenyl ester
2-chloro-3-(3-phenylureido)crotonic acid, 3,5-(diisopropyl)phenyl ester Example XVIII

| | Percent |
|---|---|
| 2-chloro-3-(3-phenylureido)crotonic acid, 2-chloro-4-(sec-butyl)phenyl ester | 12 |
| Sand (20–30 mesh) | 81 |
| Sodium silicate (28% $SiO_2$; ratio $SiO_2/Na_2O=3.25$) | 7 |

The sand and sodium silicate solution are mixed in a ribbon blender until the sand is completely wet. The active ingredient is then dusted into the mixture as it is being agitated. The granules are then discharged from the blender and dried.

This preparation is applied with a spreader around oil and gas wells prior to the rainy season.

Thirty kilograms of active ingredient per hectare will effectively control weeds such as crabgrass, cheatgrass, chickweed, and wild oats in these areas.

Example XIX

| | Percent |
|---|---|
| 2-chloro-3-(3-butylureido)crotonic acid, phenyl ester | 10 |
| 6–15 mesh expanded vermiculite | 90 |

A granular preparation is made by dissolving the active ingredient in methylene chloride, spraying it on the vermiculite, and then drying the product.

These granules are applied at the rate of 20 kg./ha. around sign posts, guard rails, and bridge abutments to control such weeds as Johnson grass, poison ivy, witchgrass, the foxtails, and morning glory.

The following compounds can be formulated and applied as in the above example and give similar results.

2-chloro-3-(3-phenyluredio)crotonic acid, p-(sec-butoxy)benzyl ester
2-chloro-3-(3-phenylureido)crotonic acid, p-(sec-butoxy)benzyl ester
2-chloro-3-(3-phenylureido)crotonic acid, 2-chloro-4-methoxyphenyl ester Example XX

| | Percent |
|---|---|
| 2-chloro-3-(3-phenyluredio)crotonic acid, phenyl ester | 25 |
| Alkylnaphthalene sulfonic acid, Na salt | 1 |
| Anhydrous sodium sulfate | 10 |
| Non-swelling clay | 64 |

These components are blended and micropulverized, then mixed with 15–20% of water and extruded under pressure through an orifice to produce rods which are then cut into pellets and dried.

This formulation is used for dry application to the soil for the control of undesirable woody plants in fence rows and utility rights-of-way. An application of one heaping tablespoonful of granules of each inch of trunk diameter at the base of each brush cluster gives control of such plants as birch, box elder, willow, oaks, sweetgum, and wild cherry.

The following compounds can be formulated and applied as in the above example and give similar results.

2-chloro-3-(3-phenyluredio)crotonic acid, 2-chloro-4-(sec-butoxy)phenyl ester
2-chloro-3-(3-phenyluredio)crotonic acid, p-nitrophenyl ester

Example XXI

| | Percent |
|---|---|
| 2-methyl - 3 - (3-phenyluredio)crotonic acid, ethyl ester | 5.0 |
| Attapulgite clay | 30.0 |
| Talc | 65.0 |

The active ingredient is micropulverized with the minor diluent to a particle size essentially below 50 microns. This composition is then blended thoroughly with the major diluent to form a 5% active dust.

The following compounds can be formulated in like manner:

2-chloro-3-(3-butylureido)crotonic acid, ethyl ester
3-(3-isoamylureido)-2-fluoro-crotonic acid, phenyl ester
3-(3-amylureido)-2-chlorocrotonic acid, ethyl ester

Example XXII

| | Percent |
|---|---|
| 2-fluoro - 3 - (3-phenylureido)crotonic acid, methyl ester | 20.0 |
| Xylene | 50.0 |
| Isophorone | 24.0 |
| Trimethylnonyl polyethylene glycol ether | 6.0 |

The above ingredients are blended until a homogeneous emulsifiable solution is obtained. A high surfactant composition can be obtained by replacing up to one-half of the xylene in the above formulation with additional trimethylnonyl polyethylene glycol ether.

Sufficient material to provide an application of 30 kg./ha. of active ingredient is emulsified in 250 liters of water and applied to a hectare of material storage area in an industrial plant. This treatment provides season-long control of crabgrass, goosegrass, ragweed, carpetweed, and other vegetation in the area.

Example XXIII

| | Percent |
|---|---|
| 3-(3-amylureido) - 2 - methylcrotonic acid, butyl ester | 10.0 |
| Aromatic weed oil | 90.0 |

The above ingredients are blended with warming to form an oil concentrate suitable for aerial application or for further dilution prior to ground spraying.

Thirty kilograms of the above liquid are applied with a helicopter to a hectare of an asparagus field in the early spring before the spears begin to emerge. This treatment controls weeds such as the chickweeds, annual bluegrass, ragweed, lambsquarters, and purslane for an extended period.

Example XXIV

| | Percent |
|---|---|
| 2-chloro - 3 - (3-phenylureido)crotonic acid, ethyl ester | 95.0 |
| Finely divided synthetic silica | 3.0 |
| Nonylphenyl polyethylene glycol ether | 2.0 |

The above ingredients are coarsely ground to give a high-strength composition which can be applied directly or used in further formulation.

Example XXV

| | Percent |
|---|---|
| 2-methyl-N - (phenylcarbamoyl) - 3-(3-phenylureido)crotonamide | 80 |
| Alkylnaphthalene sulfonic acid, Na salt | 2 |
| Partially desulfonated sodium lignin sulfonate | 2 |
| Diatomaceous silica | 4 |
| Kaolin clay | 12 |

The above components are blended and micropulverized until substantially all particles are less than 50 microns.

The following compounds can be formulated in like manner:

2-chloro-N-(phenylcarbamoyl)-3-(3-phenylureido)crotonamide
2-bromo-N-(phenylcarbamoyl)-3-(3-phenylureido)crotonamide
2-iodo-N-(phenylcarbamoyl)-3-(3-phenylureido)crotonamide
2-fluoro-N-(phenylcarbamoyl)-3-(3-phenylureido)crotonamide
2-methyl-N-(phenylcarbamoyl)-3-[3-(o-fluorophenyl)ureido]crotonamide

Example XXVI

| | Percent |
|---|---|
| 2 - methyl-N-(phenylcarbamoyl)-3-(3-phenylureido)crotonamide | 25 |
| Anhydrous sodium metasilicate | 37 |
| Anhydrous potassium carbonate | 37.5 |
| Sodium dioctylsulfosuccinate | 0.5 |

The above components are blended, micropulverized and reblended. Upon addition to water, the strongly alkaline environment solubilizes the active compound and a homogenous solution is formed.

The active component in the above formulation may be replaced by the following crotonamide:

2 - butyl-N-(phenylcarbamoyl)-3-(phenyluredio)crotonamide.

Example XXVII

| | Percent |
|---|---|
| 2 - methyl-N-(phenylcarbamoyl) - 3-[3-(o-fluorophenyl)ureido]crotonamide | 30 |
| Ca, Mg lignin sulfonate | 15 |
| Hydrated attapulgite | 1.8 |
| Sodium carbonate anhydrous | 2.5 |
| Sodium pentachlorophenate | 0.7 |
| Water | 50.0 |

The above components are premixed to a uniform slurry, then sand ground until substantially all particles are less than 5 microns. The resulting stable, aqueous suspension is readily diluted with water to use level.

The active component in the above composition may be replaced by the following crotonamides:

2 - methyl - N - (phenylcarbamoyl)-3-(3-phenylureido)crotonamide
2 - fluoro - N - phenylcarbamoyl - 3 - (3 - phenylureido)crotonamide

Example XXVIII

| | Percent |
|---|---|
| 2 - bromo-N-(phenylcarbamoyl)-3-(3-phenylureido)crotonamide | 25 |
| Soya lecithin | 5 |
| Fuel oil No. 2 | 70 |

The above components are blended, then sand ground or pebble milled until substantially all particles are less than 5 microns. The resulting oil dispersion may be diluted with herbicidal oils to a proper use level.

Example XXIX

| | Percent |
|---|---|
| 2 - methyl-N-(phenylcarbamoyl)-3-(3-phenylureido)crotonamide | 25 |
| Anhydrous sodium sulfate | 10 |
| Non-swelling Ca, Mg bentonite | 64 |
| Alkylnaphthalene sulfonic acid, Na salt | 1 |

The active component, the sodium sulfate and the surfactant are first blended and micropulverized, then blended with bentonite and moistened with 15% to 19% water. A uniform paste is obtained by pug milling. The resulting paste is extruded through ⅛" die holes, fitted with cutting knives that form pellets ⅛" x ⅛", which are subsequently dried.

The active component above may be replaced by any of the crotonamides disclosed in this invention to yield a similar formulation.

Example XXX

|  | Percent |
|---|---|
| 2 - bromo-N-(phenylcarbamoyl)-3-(3-phenylureido)crotonamide | 10 |
| Propylene glycol | 10 |
| Granular vermiculite (Zonolite No. 4) | 80 |

The active component is first micropulverized to a fine powder, then blended briefly with the vermiculite. The propylene glycol is then sprayed rapidly upon the tumbling mix to prevent segregation in storage and handling.

Any of the crotonamides disclosed in this invention may be substituted for the active named component above to yield a similar granular formulation.

Example XXXI

|  | Percent |
|---|---|
| 2 - methyl-N-(phenylcarbamoyl) - 3 - (3-phenylureido)crotonamide | 12.5 |
| Micaceous talc | 87.5 |

The above components are mixed together in a ribbon blender to produce a 10% active dust which is applicable to areas where the hazard of drift to desirable vegetation is not a problem.

Example XXXII

|  | Percent |
|---|---|
| 2 - bromo-N-(phenylcarbamoyl)-3-(3-phenylureido)crotonamide | 25 |
| Diesel oil | 67 |
| Blend of oil soluble amine salt of dodecylbenzene sulfonic acid and ethylene oxide modified fatty ester of sorbitol | 8 |

The above composition is sand or pebble milled until most particles are less than 5 microns. When added to water, the oil dispersion emulsifies. The active particles for the most part remain within the dispersed oil phase but there is some distribution between phases to yield solid particles dispersed in water and solid particles dispersed in an emulsified oil phase.

Example XXXIII

|  | Percent |
|---|---|
| 2 - bromo-N-(phenylcarbamoyl)-3-(3-phenylureido)crotonamide | 95.0 |
| Finely divided synthetic silica | 3.0 |
| Trimethylnonyl polyethylene glycol ether | 2.0 |

The above ingredients are coarsely ground to pass a 0.42 millimeter screen. This high-strength composition can be applied directly or used for further formulation.

The following series of examples illustrate the methods of employing the above formulations to control undesired vegetation.

Example XXXIV

The formulation of Example 25 using any of the six listed active ingredients is extended with water in such a manner that a rate of 50 pounds active ingredient per acre is applied in 100 gallons of water to weed infested areas along power line rights-of-way. The treatment results in kill of annual and perennial weeds such as plantain, crabgrass, horsenettle, foxtail, and panic grass. Woody plants such as willow, alder, and sumac are controlled.

Example XXXV

Sixty pounds of the formulation of Example 26 is applied in 100 gallons of water along railroad rights-of-way. The treatment results in control of unwanted vegetation such as toad flax, barnyardgrass, ragweed, goosegrass, crabgrass, wild mustard and seedling Johnson grass.

Example XXVI

One-half to one pound of the formulation of Example 27 is extended with 3 gallons of water to which 2 ounces of a surfactant, such as trimethylnonyl polyethylene glycol ether has been added. The resultant mixture is sprayed on existing vegetation around lumberyards. Sufficient volume is used to thoroughly wet the foliage and the exposed soil surface. The treatment results in control of annual and perennial weeds such as purslane, knotweed, chicory, foxtail, touch-me-not and quackgrass.

Example XXXVII

The formulation of Example 27 is diluted with oil so that 25 pounds per acre (active ingredient) are applied in 80 gallons of herbicidal oil to vegetation growing around oil tank farms or grain elevators. The application results in control of annual and perennial vegetation.

Example XXXVIII

The pellets formed in Example 29 are scattered by helicopter over a stand of arborvitae at a rate of 8 pounds (active ingredient) per acre. Treatment is made early in the spring before weeds emerge. The treatment results in kill of crabgrass, foxtail, mustard, ragweed, and barnyardgrass while allowing conifers to grow normally.

Example XXXIX

The granules of Example 29 are spread with a fertilizer spreader in late summer at a rate of 8 pounds (active ingredient) per acre on an area which is to be planted with young Christmas trees the following spring. The application is made on rows 18 inches wide coinciding with the rows to be planted to trees. The treatment results in control of weeds under the small seedlings for the next summer and allows easier maintenance of the young tree.

Example XXXX

Thirty-two pounds per acre of the dust of Example 31 are applied with a grain drill before final harrowing to a cultivated field which is to be held fallow for one season. The final harrowing distributes the material so that extended control is obtained of such species as ragweed, mustard, flower-of-an-hour, crabgrass, foxtail and cheatgrass.

Example XXXXI

The formulation of Example 32 is extended with water in such a manner that ½ pound per acre (active ingredient) is applied in 20 gallons of water as a direct post emergence spray to a newly planted field of sugarcane at the time of the last cultivation. The treatment results in control of the weeds growing in the row and provides preemergence control of weeds for four to six weeks. The cane shows normal growth.

I claim:

1. A method for the control of undesired vegetation, comprising applying to the locus to be protected a herbicidally effective amount of a compound of the formula:

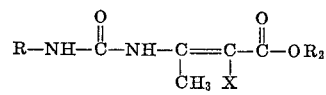

wherein

R is phenyl or o-fluorophenyl;
$R_2$ is alkyl of 1 to 4 carbon atoms; and
X is halogen.

2. A method according to claim 1 wherein the compound is ethyl 2-chloro-3-(3-phenyluredio)crotonate.

References Cited
UNITED STATES PATENTS

| | | | |
|---|---|---|---|
| 3,228,972 | 1/1966 | Schwartz | 71—106 X |
| 3,235,357 | 2/1966 | Loux | 71—81 X |
| 3,282,987 | 11/1966 | Ellis | 71—107 X |
| 3,404,975 | 10/1968 | Wilson et al. | 71—111 X |

JAMES O. THOMAS, Jr., Primary Examiner

U.S. Cl. X.R.

71—106, 120